United States Patent

[11] 3,586,870

| [72] | Inventor | Donald N. Cwiak<br>6538 Blucher Ave., Van Nuys, Calif. 91406 |
|---|---|---|
| [21] | Appl. No. | 873,559 |
| [22] | Filed | Nov. 3, 1969 |
| [45] | Patented | June 22, 1971 |

[54] POWER SOURCE ADAPTOR FOR BATTERY POWERED DEVICES
7 Claims, 5 Drawing Figs.

[52] U.S. Cl. .................................................. 307/66, 320/2, 46/244
[51] Int. Cl. ...................................................... H02j 7/00
[50] Field of Search............................................ 307/64, 65, 66; 46/45, 228, 244 A

[56] References Cited
UNITED STATES PATENTS
3,329,881  7/1967  Tolmie ........................ 307/66 X Primary Examiner—Robert K. Schaefer
Assistant Examiner—H. J. Hohauser
Attorney—Roger A. Marrs ABSTRACT: A device is disclosed herein for providing power to a toy, flashlight or similar load normally powered by one or more batteries. The device comprises a substitute expandable cell adapted for insertion in the toy in place of the battery normally used. The substitute cell includes a convoluted, expandable insulative shell and conductive terminals configured identically to the battery, a flexible electrical cable leading from the terminals to a power unit. The power unit comprises a power supply accepting household AC voltage and providing a DC output equal in voltage to that supplied by the batteries being replaced.

PATENTED JUN 22 1971
3,586,870
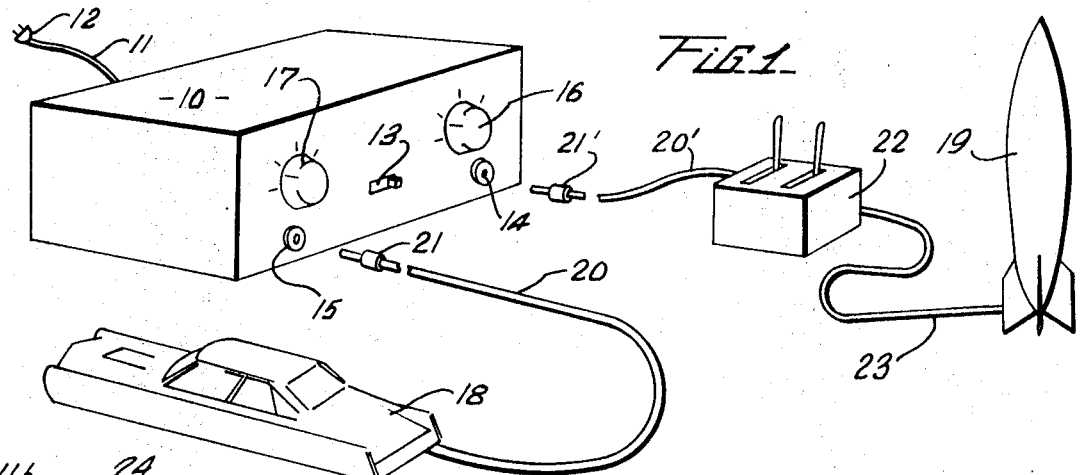
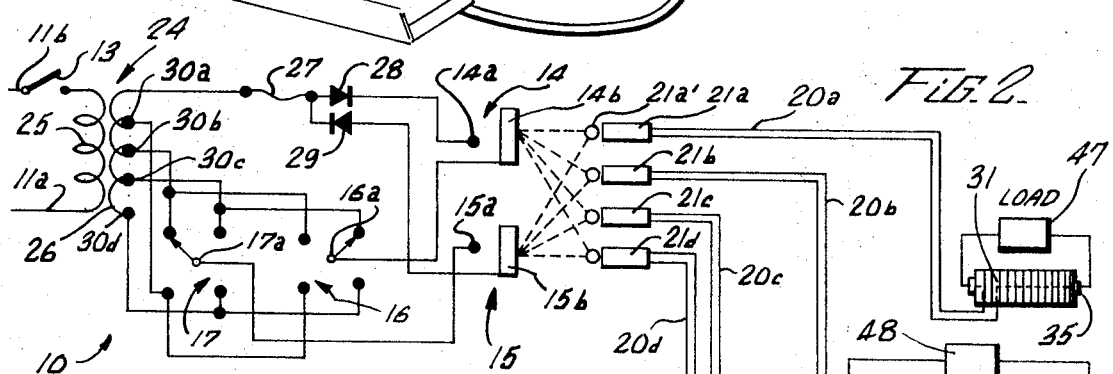
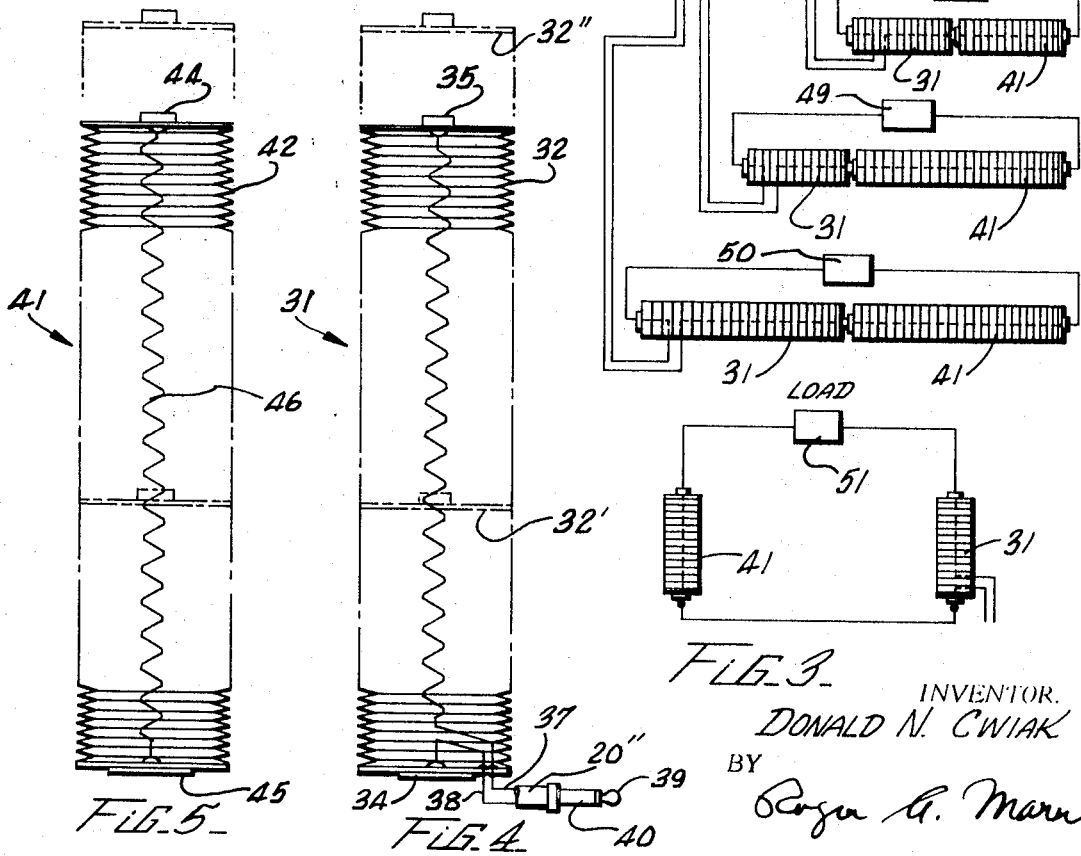
INVENTOR.
DONALD N. CWIAK
BY
Roger A. Marrs

POWER SOURCE ADAPTOR FOR BATTERY POWERED DEVICES

BACKGROUND OF THE INVENTION

1. Field of the Invention

The present invention relates to power adaptor devices and, more particularly, to a device for providing power to a toy or similar load normally powered by batteries.

2. Description of the Prior Art

As most parents will attest, children greatly enjoy playing with battery-operated toys. A great variety of such toys is available on the market, ranging from automobiles, trains, rockets and the like, to battery-powered talking dolls, animated animals, and a wide variety of games. Typically, such toys include one or more small electric motors, electric light bulbs, noise makers, or other electromechanical devices. Other battery-operated devices include radios, phonographs and tape players.

A common feature of all these battery-operated devices, particularly those utilizing motors, is the limited lifetime of the batteries. Thus, after a few hours or a few days of utilization, the batteries must be replaced. It is not unusual that over the lifetime of a toy, the cost of replacement batteries may be greater than the initial cost of the toy itself.

To eliminate the need for constantly replacing batteries, one approach of the prior art has been to provide rechargeable cells, together with an appropriate unit for recharging the cells when necessary. The disadvantage of this approach is that the number of rechargeable cells required equals the number of cells normally employed by the toys. Since rechargeable cells are relatively expensive, this approach is economically unsatisfactory.

The present invention overcomes the shortcomings of the prior art by providing a device for powering a plurality of battery-operated devices, the device accepting household AC power and providing appropriate DC voltage to the devices via substitute cells which replace directly the batteries normally used by the toys.

SUMMARY OF THE INVENTION

The present invention comprises a device for providing power to a toy or similar load normally powered by one or more batteries. The device comprises a substitute cell having a size and shape corresponding to that of a battery normally used by the toy. Terminals on the substitute cell are connected to one end of a flexible electrical cable, the other end of which terminates in an appropriate plug. Should more than one battery be used by the toy, one battery is replaced by the substitute or "master" cell, and the others are replaced by dummy cells having size and shape corresponding to that of the batteries, but having a direct electrical connection between the two terminals.

The invention also includes a power unit which accepts household AC power and provides at one or more jacks a DC voltage equal to one, two, three or more batteries. In a typical embodiment, the power unit includes a power transformer, appropriate rectifier means to rectify the transformer output to DC and switching means associated with taps on the secondary of the transformer to selectively determine the output voltage provided by the power unit.

In operation, the substitute cell and, if required, one or more dummy cells, are inserted in the toy in place of the normally used batteries. The electrical cable from the substitute cell is plugged into one of the jacks in the power unit, and the associated switch set to a position designated to correspond to the number of batteries normally used by the toy. The toy then is operable from voltage supplied by the power unit.

Thus, it is among the primary objects of the present invention to provide a device for powering a toy or similar load normally powered by a battery.

Another object of the present invention is to provide a power supply adapted to convert household AC power to a low-level voltage and means for connecting this DC voltage to a normally battery operated toy.

It is another object of the present invention to provide a substitute cell adapted to replace a battery in a toy, the substitute cell including a flexible electrical conductor for connection to the toy of an external power source.

A further object of the present invention is to provide in combination a substitute cell adapted to replace a battery in a toy or similar load and a power supply for providing an appropriate DC voltage to the substitute cell via electrical conductors connected to terminals of the substitute cell.

Yet another object of the present invention is to provide a power supply for supplying voltage to a device, normally operated by several batteries, one of the batteries being replaced with a substitute cell externally connected to the power supply, the other batteries being replaced with dummy cells in which the terminals are electrically shorted.

BRIEF DESCRIPTION OF THE DRAWINGS

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

FIG. 1 is a perspective view of the inventive device for providing power to a toy or the like. Evident in the figure is the power unit and several toys, the batteries of which have been replaced with substitute cells having power leads adapted to be plugged into the power unit;

FIG. 2 is an electrical schematic diagram of the power unit shown in FIG. 1 and of the substitute cells and associated leads from the loads being powered;

FIG. 3 is an electrical schematic diagram of another circuit incorporating the expandable substitute cells arranged in a parallel circuit;

FIG. 4 is a side elevational view of a substitute cell in accordance with the present invention; and FIG. 5 is a side elevational view of a dummy cell useful in conjunction with the present invention, should the load being powered normally employ more than one battery.

DESCRIPTION OF THE PREFERRED EMBODIMENTS

In accordance with the present invention, there is provided a device for supplying power to a toy or similar load which normally is powered by one or more batteries. As shown in FIG. 1, the invention includes a power unit 10 adapted to receive household AC voltage via line cord 11 and plug 12. The power unit is turned ON and OFF by means of switch 13. In the embodiment shown, power unit 10 is capable of providing power independently to two loads, via a first jack 14 and a second jack 15. The voltage level available at jack 14 is controlled by a selector switch 16, while the voltage level available at jack 15 is controlled by a selector switch 17. Switches 16 and 17 are of the multiposition variety, the positions being designated by numbers which may correspond to the number of batteries normally utilized by the load being powered by power unit 10.

Also shown in FIG. 1 are several toys which normally are battery powered, but which may be powered by the present invention. Illustrated, for example, is a toy automobile 18 and a toy rocket 19. Car 18 normally is powered by one or more batteries, typically of the 1½-volt D-cell variety. In accordance with the present invention, these batteries have been replaced by appropriate substitute dummy cells, to be described in detail hereinbelow, and provided with a two-conductor flexible lead 20 terminating in a plug 21. Plug 21 is adapted for insertion into either of jacks 14 or 15.

Toy rocket 19 normally is powered by one or more batteries contained within a control unit 22 which is associated with rocket 19 and connected thereto by electrical lead 23. (Control unit 22 forms no part of the present invention). The batteries normally powering toy rocket 19 have been replaced with substitute and dummy cells in accordance with the present invention, power thereby being provided to control unit 22 and rocket 19 via flexible lead 20' and and plug 21'. Plug 21' is adapted for insertion into either of jacks 14 or 15 in power unit 10.

An electrical schematic diagram of power unit 10 is shown in FIG. 2. Referring thereto, power unit 10 includes a transformer 24 having a primary winding 25 adapted to receive household AC voltage, typically 110 volts at 60 cycles, supplied via conductors 11a and 11b. On-off switch 13 is connected in series with primary winding 25. One end of the secondary winding 26 of transformer 24 is connected via a fuse 27 to the anode of a first diode 28 and to the cathode of a second diode 29. The cathode of diode 28 is connected to the positive terminal 14a of jack 14. The anode of diode 29 is connected to the negative terminal 15b of jack 15. The negative terminal 14b of jack 14 is connected to the rotary contact 16a of selector switch 16. The positive contact 15a of jack 15 is connected to the rotary contact 17a of switch 17.

A first tap 30a on secondary winding 26 (see FIG. 2) is connected to terminal 1 of switch 16 and to terminal 1 of switch 17. Similarly, taps 30b, 30c and 30d respectively are connected to terminals 2, 3 and 4 of switch 16 and to terminals 2, 3 and 4 of switch 17.

In operation, when switch 13 is closed, an AC voltage appears across secondary 26 of transformer 24. During alternate half-cycles, rectifier diode 28 conducts, thereby providing across terminal 14a and 14b of jack 14 a DC output having a voltage level determined by the setting of switch 16a. During the other half-cycles of the AC output from transformer 26, rectifier diode 29 conducts, thereby providing a DC voltage across terminals 15a and 15b of jack 15, the magnitude of which voltage depends on the setting of switch 17.

Preferably, taps 30a, 30b, 30c and 30d are appropriately selected so as to provide at jacks 14 or 15 voltages substantially equal to that provided by one, two, three or four of the batteries being replaced by the inventive power unit. For example, tap 30c is selected so that when rotary contact 16a is placed at switch position 3, a DC output will be available at jack 14 having a voltage level equal to that provided by three batteries. Should the batteries be of the typical D-cell variety, each of 1.5 volts, then tap 30a is selected to provide 1.5 volts at jack 14 when switch 16 is at position 1. Similarly, tap 30b is selected so as to provide 3 volts at jack 14 when switch 16 is at position 2 and tap 30d is selected to provide 6 volts at jack 14 when switch 16 is at position 4.

Referring now to FIG. 4, there is shown a substitute cell 31 adapted for insertion into a toy or the like in place of the battery normally used to power the load. Substitute cell 31 comprises an expandable insulative shell 32 conforming in shape to the shape of the battery being replaced. In the embodiment illustrated in FIG. 4, shell 32 comprises a substantially hollow, cylindrical, convoluted member, fabricated of plastic or the like, the outside diameter of which corresponds to the diameter of a conventional D-cell. Attached to opposite ends of shell 32 are conductive terminals 33 and 34 which conform in shape and location to the standard terminals of a D-cell. Extending from substitute cell 31 is a flexible electrical cable 20" comprising a first conductor 37 and a second conductor 38. The ends of conductors 37 and 38 extend through the hollow of the shell and are electrically connected to terminals 34 and 35. A selected one of the conductors is connected to the tip 39 of jack 21". The other or second conductor of lead 20" is electrically connected to negative terminal 34 while the other end of the conductor is connected to the ring 40 of plug 21".

A feature of the invention resides in the expandable shell 32 which may be compressed in its length to that indicated in broken lines by number 32' or elongated to the extent shown by 32". In this manner, the substitute cell can effectively replaces one, two or more conventional battery cells. Also, exact dimensions are not required in the fabrication of substitute cells. The lead conductor 37 is of sufficient length to permit expansion of compression of the shell. When contracted, excess conductor length lies within the hollow of the shell.

Shown in FIG. 5 is a dummy cell 41 useful in conjunction with the present invention should the load being powered normally employ more than one substitute cell. Dummy cell 41 comprises a substantially cylindrical insulative and expandable shell 42 of convolutions having a diameter corresponding generally with that of the battery being replaced. Provided respectively at the ends of shell 42 are a pair of conductive terminals 44 and 45 having a shape and location corresponding to that of the terminals of a typical D-cell. An electrical conductor 46 extends within the shell hollow to electrically short terminals 44 and 45.

Referring once again to FIG. 2, load 47 represents the electrical load portion of a typical toy normally powered by a single battery. To operate load 47 from power unit 10, the battery normally powering load 47 is replaced by a substitute cell 31 of the type described above in conjunction with FIG. 4, and having an associated flexible lead 20a terminating in a plug 21a. Plug 21a is inserted into either of jacks 14 or 15, and the corresponding selector switch 16 or 17 set at position 1 to provide a voltage to load 47 equal to the voltage provided by one cell. Of course, the polarity of the voltage supplied to load 47 will correspond to that supplied by the cell being replaced, since the tip 21a' of plug 21a which is electrically connected to the positive terminal 33 of substitute cell 31 contacts positive terminal 14a or 15a of jack 14 or 15.

Still referring to FIG. 2, loads 48, 49 and 50 respectively represent the electrical loads of a toy or like device requiring two, three or four batteries for their operation. In each case, one of the batteries required by the load is replaced by one substitute cell 31, and the remaining batteries are replaced by a like number of dummy cells 41. For example, the three cells which normally power load 49 are replaced by one substitute cell 31 and one dummy cell 41. In each instance, the associated plug 21b, 21c or 21d (terminating flexible cables 20b, 20c and 20d respectively) is inserted into one or the other of jacks 14 or 15, and the corresponding selector switch 16 or 17 turned to position 2, 3 or 4 as the case may be, the setting of the switch corresponding to the total number of cells normally required to operate the load. For example, should load 50 be powered by inventive power unit 10 via lead 20d, plug 21d and jack 15, then associated switch 17 would be placed in the 4 position, corresponding to the four cells normally required to operate load 50.

It will be appreciated that various changes or modifications to the present invention may be made without departing from the spirit and scope thereof. For example, while power unit 10 has been illustrated as including switches to permit selection of the voltage available at the output terminals, this is not required. For example, power unit 10 may be adapted only to provide the voltage equal to, say, three cells, rather than to provide selectable voltages as illustrated in the schematic diagram of FIG. 2. Alternatively, separate jacks may be provided for each available voltage level. In this instance, the plug from the substitute cell would be inserted into that jack supplying the voltage level required by the toy being powered. Alternatively, other electrical circuitry may be provided in power unit 10 to supply the necessary voltage. For example, a transformer having an untapped secondary winding may be used and an appropriate resistor divider network employed to provide the requisite voltage levels. In yet another embodiment, a circuit employing full wave rectification could be used in place of the half-wave rectification system illustrated in FIG. 2. Then too, other types of connectors, for example, screw-type terminals, could be used in place of plugs 21 and jacks 14 and 15.

In FIG. 3, substitute cells 31 and 41 are arranged in a parallel circuit with respect to the load 51 and the power supply. Again, a single substitute cell may take the place of a plurality of battery cells in a series arrangement. This is because of the extendable construction of the substitute cells. If desired, an expansion spring may be housed within the internal hollow cavity defined by the shell operating against the opposite ends thereof to normally expand the cell.

While the invention has been described with respect to several physical embodiments constructed in accordance therewith, it will be apparent to those skilled in the art that various modifications and improvement may be made without departing from the scope and spirit of the invention. Accordingly, it is to be understood that the invention is not to be limited by the specific illustrative embodiments, but only by the scope of the appended claims.

What I Claim is:

1. A device for providing power to a toy or similar load normally powered by one or more batteries, said device comprising:
   a longitudinally yieldable substitute cell adapted for insertion in said toy in place of said battery, said substitute cell comprising:
   an expandable, insulative shell having the cross-sectional shape of said battery and formed with a plurality of integrally formed convolutions defining an internal hollow cavity;
   conductive terminals attached to said shell closing the open ends of said cavity in positions identical to the terminals of said battery;
   a two-conductor flexible lead carried in said cavity, one end of each conductor being connected to a corresponding one of said conductive terminals; and
   power unit means for providing to the other end of said conductors a DC voltage corresponding in level to that normally provided by said batteries.

2. The device defined in claim 1 wherein the other end of each conductor is provided with a connector, and wherein said power unit means comprises:
   a transformer having a primary winding adapted to receive household AC voltage, and a secondary winding adapted to provide voltages commensurate with those required to operate said toy;
   rectifier means for converting the voltage obtained from said secondary winding to DC and
   terminal means connected to said DC and adapted to connection thereto of said connector whereby insertion of said substitute cell in said toy and connection of said connector to said terminal means permits said load to be powered by said device.

3. The device defined in claim 2 wherein said secondary winding is tapped; and further including:
   switch means for connecting a selected one of said taps to one terminal of said terminal means; and
   said plurality of convolutions normally biasing said cell into its expanded condition.

4. The device defined in claim 3 further comprising:
   a switch connected in series with the primary of said transformer for disconnecting said transformer from said household voltage;
   a fuse connected between one end of said secondary winding and said rectifier means; and wherein
   said connector comprises a two-conductor male plug and wherein said terminal means comprises a two-conductor female jack adapted to receive said plug.

5. The device defined in claim 3 further comprising:
   second rectifier means for converting the voltage obtained from said secondary winding to produce a DC signal, said first and second rectifier means respectively conducting on opposite phases of the said AC voltage from said secondary, each of said rectifier means providing a separate DC output from said power unit means.

6. The device defined in claim 5 wherein
   the anode of said first rectifier means and the cathode of said second rectifier means are each connected to one end of said secondary winding; and wherein
   the cathode of said first rectifier means and the anode of said second rectifier means are connected respectively to one terminal of each of first and second terminal means, the other terminal of each of said terminal means being connected via a switch to a selected tap on said secondary winding whereby a lead from a first load may be connected to said first terminal and a lead from a second load may be connected to said second terminal.

7. In combination with the device of claim 1, one or more dummy cells each comprising:
   a longitudinally expandable and insulative shell having the cross-sectional shape of said battery;
   conductive terminals attached to said cells in positions identical to the terminals of said battery;
   electrical conductor means for electrically shorting said conductive terminals; and
   said dummy cell being adapted for insertion in said toy in addition to and in electrical series with said substitute cell.